(12) United States Patent
Wilkosz et al.

(10) Patent No.: US 10,820,142 B2
(45) Date of Patent: Oct. 27, 2020

(54) DISTRIBUTING AN APPLICATION TO PORTABLE COMMUNICATION DEVICES

(71) Applicant: MOTOROLA SOLUTIONS, INC., Chicago, IL (US)

(72) Inventors: Pawel Wilkosz, Wisniowa (PL); Szczepan Folta, Cracow (PL); Witold Knapek, Radziechowy (PL); Piotr Lewandowski, Opole (PL); Lukasz Piotr Wojtas, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 85 days.

(21) Appl. No.: 16/466,944

(22) PCT Filed: Dec. 29, 2016

(86) PCT No.: PCT/PL2016/050060
§ 371 (c)(1),
(2) Date: Jun. 5, 2019

(87) PCT Pub. No.: WO2018/124895
PCT Pub. Date: Jul. 5, 2018

(65) Prior Publication Data
US 2019/0306656 A1 Oct. 3, 2019

(51) Int. Cl.
*H04W 4/90* (2018.01)
*H04W 4/021* (2018.01)
*H04L 29/08* (2006.01)

(52) U.S. Cl.
CPC ............ *H04W 4/021* (2013.01); *H04L 67/34* (2013.01); *H04W 4/90* (2018.02)

(58) Field of Classification Search
CPC ......... H04M 1/72536; H04M 2242/04; H04M 3/5116; H04M 11/04; H04W 4/90; H04W 14/90; H04Q 3/0029
See application file for complete search history.

(56) References Cited

U.S. PATENT DOCUMENTS 8,868,692 B1 * 10/2014 Khanna ................... H04L 67/34
709/219
9,374,363 B1 6/2016 Paczkowski et al.
(Continued)

FOREIGN PATENT DOCUMENTS

WO 2009/136259 11/2009
WO 2014/036296 3/2014

OTHER PUBLICATIONS

PCT/PL2016/050060 International Search Report and Written Opinion of the International Searching Authority dated Mar. 2, 2017 (10 pages).
International Preliminary Report on Patentability dated Jul. 11, 2019 for International Application No. PCT/PL2016/050060 (8 pages).

*Primary Examiner* — Rafael Pérez-Gutiérrez
*Assistant Examiner* — Xiang Zhang
(74) *Attorney, Agent, or Firm* — Michael Best & Friedrich LLP

(57) ABSTRACT

A communication server and a method of operating for distributing an application to a plurality of portable communication devices in response to a public safety event. The communication server includes an electronic processor that determines an incident area that geographically surrounds a location of the public safety event, and determines a desired number and desired roles of personnel to respond to the public safety event. The electronic processor also determines whether portable communication devices are located within the incident area. The electronic processor then automatically transmits the application to portable communication devices located within the incident area and associated with the desired roles of personnel until the application is installed on a number of portable communication devices that equals the desired number of personnel for each role.

18 Claims, 4 Drawing Sheets

(56) References Cited

U.S. PATENT DOCUMENTS

| | | | |
|---|---|---|---|
| 10,277,631 B1* | 4/2019 | Gemeniano | H04W 12/1006 |
| 2003/0054833 A1* | 3/2003 | Hayduk | H04M 1/72525 |
| | | | 455/456.1 |
| 2010/0328093 A1* | 12/2010 | Robinson | G06Q 10/10 |
| | | | 340/8.1 |
| 2011/0208797 A1 | 8/2011 | Kim | |
| 2012/0246630 A1* | 9/2012 | Kuzins | G06F 8/61 |
| | | | 717/169 |
| 2012/0275391 A1* | 11/2012 | Cui | H04W 72/1247 |
| | | | 370/329 |
| 2012/0282922 A1* | 11/2012 | Fodor | H04W 8/22 |
| | | | 455/426.1 |
| 2014/0357226 A1* | 12/2014 | Charugundla | H04W 4/023 |
| | | | 455/411 |
| 2015/0050922 A1* | 2/2015 | Ramalingam | H04W 12/08 |
| | | | 455/418 |
| 2015/0085111 A1* | 3/2015 | Lavery | H04N 21/21805 |
| | | | 348/143 |
| 2015/0111516 A1 | 4/2015 | Schuette et al. | |
| 2015/0281870 A1* | 10/2015 | Sugaya | H04W 4/029 |
| | | | 455/414.1 |
| 2016/0135143 A1* | 5/2016 | Won | H04W 72/005 |
| | | | 370/312 |
| 2016/0182707 A1* | 6/2016 | Gabel | H04W 4/90 |
| | | | 455/404.2 |

* cited by examiner

DISTRIBUTING AN APPLICATION TO PORTABLE COMMUNICATION DEVICES

BACKGROUND OF THE INVENTION

Current portable communication devices, for example two-way radios and smart phones, may download software applications from remote servers. The applications may be configured to perform various functions including providing access to cloud-based resources. The software applications may enable access to resources to assist emergency responders in obtaining access to secured databases and emergency communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
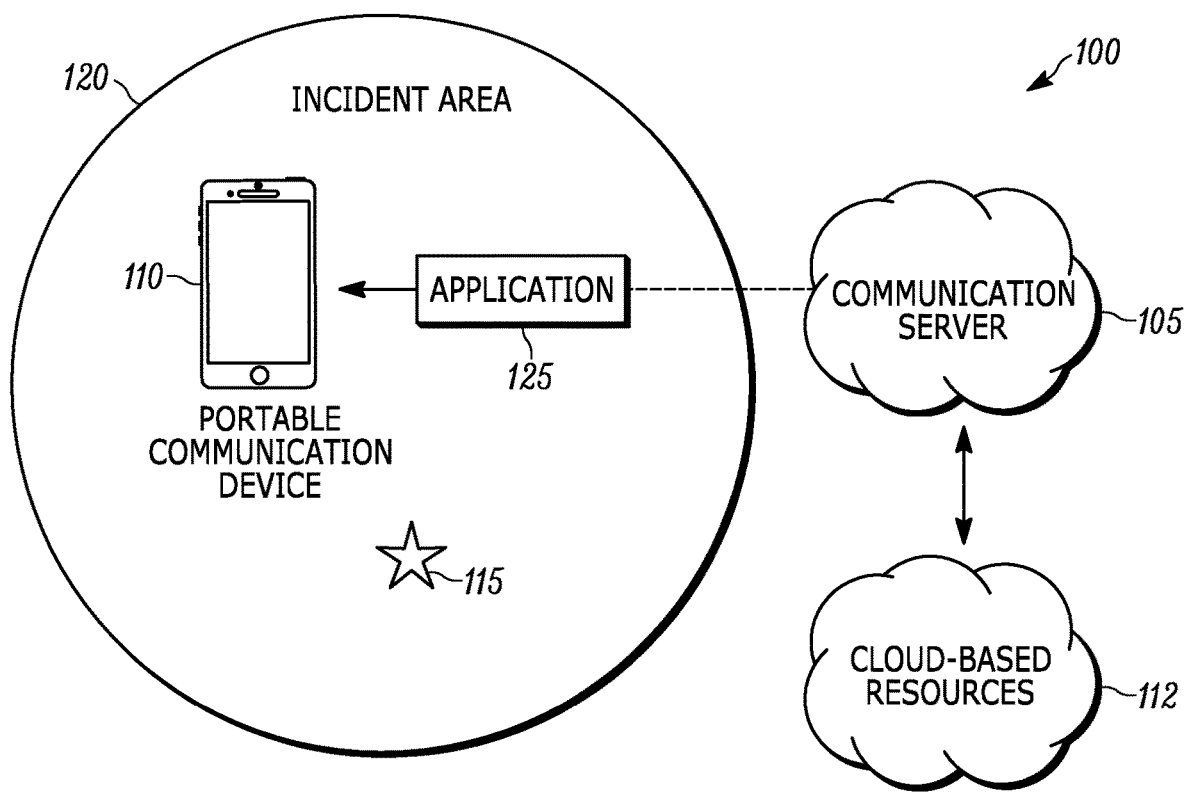
FIG. 1 is a diagram of a wireless communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

While the ability to download software applications on mobile devices has benefits, typically the applications must be manually downloaded and installed prior to use, which takes some amount of time to accomplish. The ability to act quickly is important to emergency responders. Response times may be slowed when the emergency responder needs access to resources during an emergency while waiting for downloading and installation of software applications to complete.

One embodiment provides a method of distributing an application to a plurality of portable communication devices in response to a public safety event. The method includes determining an incident area that geographically surrounds a location of the public safety event. The method also includes determining a desired number and desired roles of personnel to respond to the public safety event; determining whether portable communication devices are located within the incident area; and automatically transmitting, from a communications server, the application to portable communication devices located within the incident area and associated with the desired roles of personnel until the application is installed on a number of portable communication devices that equals the desired number of personnel for each role.

Another embodiment provides a communication server for distributing an application to a plurality of portable communication devices in response to a public safety event. The communication server includes, among other things, an electronic processor configured to determine a location of an incident area that geographically surrounds the public safety event and to determine a desired number and desired roles of personnel to respond to the public safety event. The electronic processor is further configured to determine whether portable communication devices are located within the incident area, and to automatically transmit the application to portable communication devices located within the incident area and associated with the desired roles of personnel until the application is installed on a number of portable communication devices that equals the desired number of personnel for each role.

FIG. 1 illustrates an example of a wireless communication network 100 that includes a communication server 105, at least one portable communication device 110, and cloud-based resources 112. The wireless communication network 100 controls and coordinates radio and network traffic between multiple portable communication devices. The control and coordination of radio and network traffic includes controlling access to the wireless communication network 100, communications within the wireless communication network 100, and access to out-of-network services. In some embodiments, the wireless communication network 100 supports two-way trunked radio communications and may include base stations, repeaters, site controllers, zone controllers, and the like. The communications support may include using dedicated control channels for controlling various aspects of the operation of the portable communication device 110. In some embodiments, the wireless communication network 100 also supports cellular communications, internet protocol (IP) communications, voice over IP communications, messaging, and other communications.

The wireless communication network 100 may also provide remote access to the cloud-based resources 112, which may include internet and non-internet resources. For example, the wireless communication network 100 may link the portable communication device 110 with remote servers that provide software applications for download. In some embodiments, the wireless communication network 100 itself provides applications to the portable communication devices. In addition, in some embodiments, the wireless communication network 100 is configured to provide network security. Network security may be provided, for example, by controlling access by the portable communication device 110 to the cloud-based resources 112 and other network services including, for example, downloading of applications, two-way radio communications, cellular communications, internet access, and messaging.

Generally, the portable communication device 110 may include various types and styles of communication devices including mobile telephones, smart telephones, smart watches, tablet computers, land mobile radios, and others. The portable communication device 110 may operate over various communication channels and networks. The portable communication device 110 is configured to communicatively connect to the wireless communication network 100. In some embodiments, the portable communication device 110 is configured to communicatively connect to networks other than the wireless communication network 100. For example, the portable communication device 110 may communicatively connect to a cellular network, a land mobile radio network, a trunked radio network, a wireless local area network (for example, a Wi-Fi network), a short range wireless network (for example, Bluetooth network), and others. The wireless communication network 100 may provide emergency services and network access to the portable communication device 110 upon the occurrence of a public safety event. In some embodiments, the portable communication device 110 is a personal mobile phone that has a secondary function of acting as an emergency response device when control signals from the communication server 105 are received. For example, a personal mobile device of a police officer may function as a police radio when control signals from the communication server 105 are received.

Also illustrated in FIG. 1 are a public safety event 115, an incident area 120, and an application 125. The public safety event 115 represents the location of an event requiring a response by public or private personnel. The public safety event 115 may be a fire, a medical emergency, an accident, a crime in progress, a terrorist attack, or similar event. The incident area 120 is established around or to surround the public safety event 115. The incident area 120 may be linked to or correlated with a geo-fence so that its boundary is defined and it is possible to track movement of device to and from the incident area 120. When inside the incident area 120, the portable communication device 110 may receive an application 125 from the communication server 105. The application 125, once installed on the portable communication device 110, enables particular functions and network access relating to tasks helpful in responding to the public safety event 115.

Figure 2:
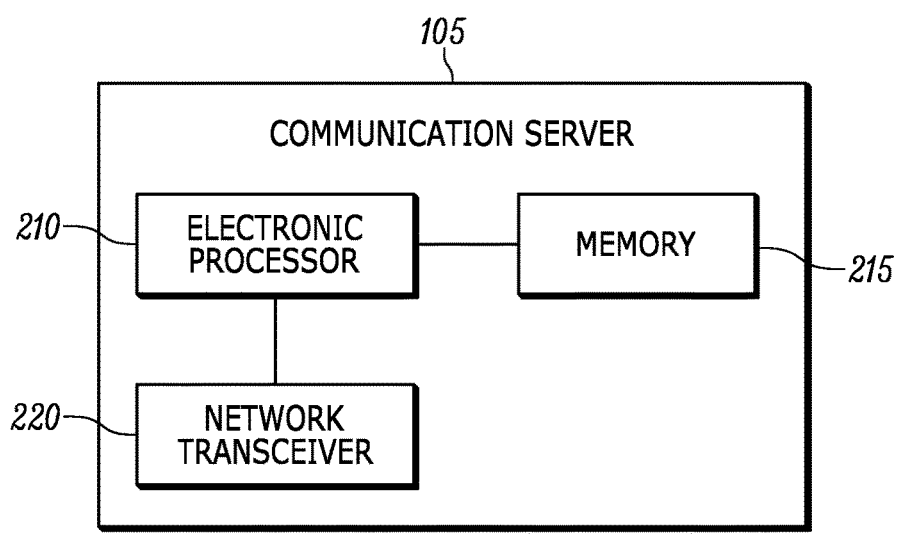
FIG. 2 is a diagram of a communication server of the wireless communication network of FIG. 1 in accordance with some embodiments.

One example configuration of the communication server 105 is illustrated in FIG. 2. In this example, the communication server 105 includes a plurality of electrical and electronic components that provide power, operation control, and protection to the components and modules within the communication server 105. The communication server 105 includes an electronic processor 210 (for example, a programmable electronic microprocessor, microcontroller, or similar device), a memory 215 (for example, non-transitory, machine-readable memory), and a network transceiver 220. In other embodiments, the communication server 105 includes additional, fewer, or different components.

Figure 3:
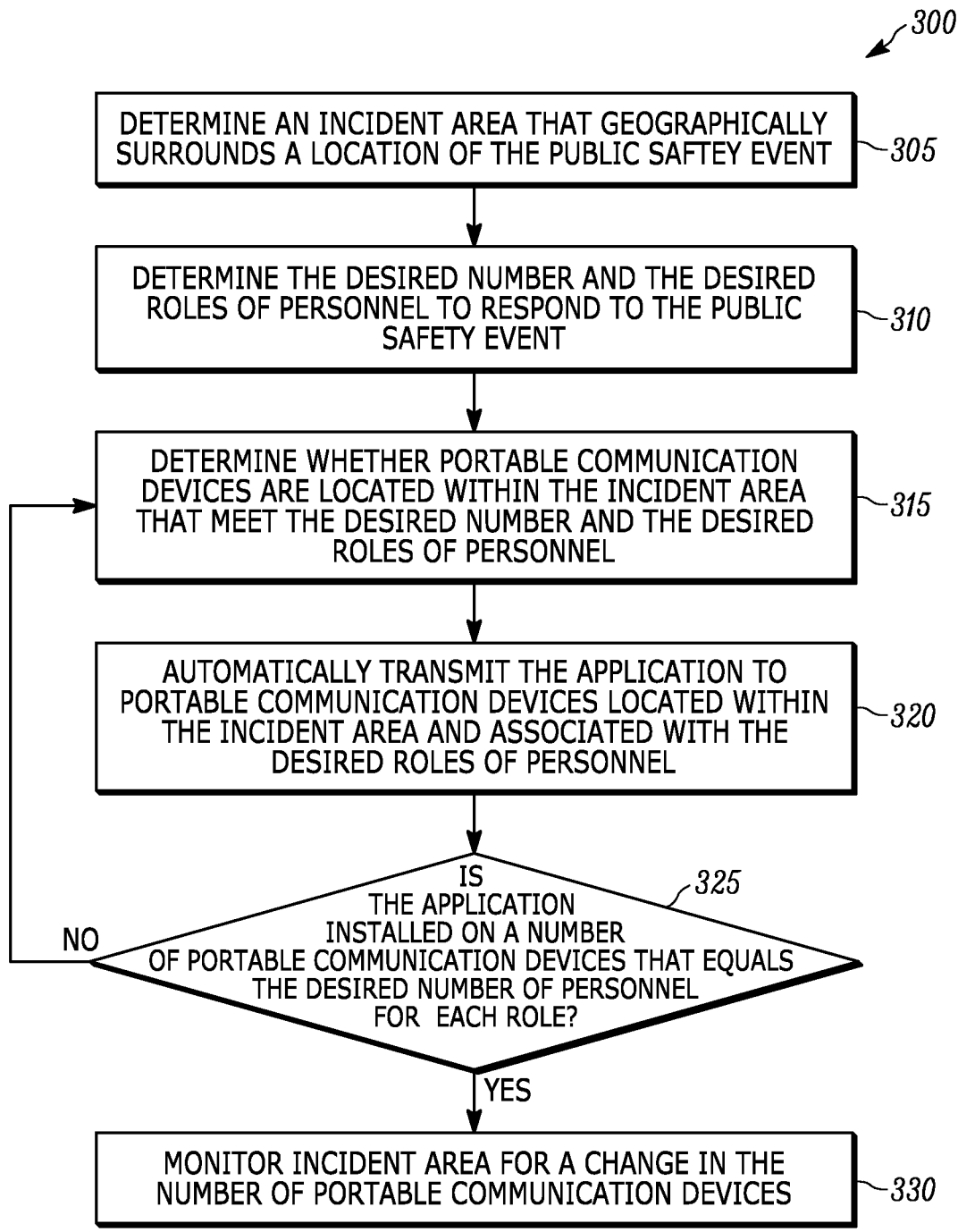
FIG. 3 is a flowchart of a method of distributing an application by the communication server of FIG. 2 in accordance with some embodiments.

FIG. 3 illustrates a method 300 of distributing the application 125 by the communication server 105 to multiple portable communication devices according to one example. In the method 300, the communication server 105 determines the incident area 120 that geographically surrounds the location of the public safety event 115 (block 305). For example, in some embodiments, the communication server 105 receives a notification that the public safety event 115 is occurring. In some cases, the communication server 105 receives an input from a dispatcher (for example, a 911 or emergency telephone number dispatcher) indicative of the occurrence of the public safety event 115. The communication server 105 may also receive a selection by the dispatcher indicating a size and shape of the incident area 120.

In other cases, the communication server 105 receives the notification of the occurrence of the public safety event 115 and the incident area 120, by other sources, including from personnel near the scene of the public safety event 115. In yet other cases, the communication server 105 may automatically establish the occurrence and the location of the public safety event 115 based, at least in part on internal programming. This may include linking to the multiple portable communication devices near the public safety event 115 and establishing the location of the public safety event 115 via global positioning system coordinates of the multiple portable communication devices. In some embodiments, the communication server 105 may automatically establish the incident area 120 based on the type of the public safety event 115, the location of the public safety event 115, or both. This may include referencing a predetermined database of information outlining protocols for responding to different types and sizes of public safety events.

In the method 300, the communication server 105, via the electronic processor 210, determines the desired number and the desired roles of personnel to respond to the public safety event 115 (block 310). For example, the communication server 105 may receive a selection or message indicating the number and type of personnel needed to respond to the public safety event 115 from a dispatcher. In another example, the communication server 105 may automatically determine, based on predetermined procedures, the number and type of personnel needed based on the type and size of the public safety event 115. In either case, the communication server 105 may determine how many personnel of each role are desired for response to the public safety event 115. In one example, the communication server 105 may select two medical responders and one police officer as desired responders for a medical emergency.

The electronic processor 210 of the communication server 105 then determines whether portable communication devices are located within the incident area 120 that meet the desired number and the desired roles of personnel (block 315). This includes establishing communication with the portable communication devices and obtaining identifying information from the portable communication devices as explained below.

In the method 300, the electronic processor 210 automatically transmits the application 125 to portable communication devices located within the incident area 120 and that are associated with the desired roles of personnel (block 320). Transmission of the application 125 may also include a control signal that when received by portable communication devices automatically initiates installation of the application 125 on the portable communication devices. As a consequence, installation of the application 125 may occur without any input from users of the portable communication devices.

The electronic processor 210 also determines when the application 125 is installed on a number of portable communication devices that equals the desired number of personnel (block 325). In particular, the electronic processor 210 determines how many of each type of personnel are desired for response to the public safety event 115 and compares this number to the number of portable communication devices 110 that have the application 125 installed. In one example, when two medical responders are desired, the electronic processor 210 transmits the application 125 to portable communication devices that are associated with medical personnel until two portable communication devices that are associated with medical personnel have the application 125 installed. This includes portable communication devices that have the application 125 preinstalled and portable communication devices that have just installed the application 125.

When less than the desired number of portable communication devices are located in the incident area 120, the electronic processor 210 determines whether portable communication devices that are associated with or match the desired roles enter the incident area 120 (block 315). In this case, the electronic processor 210 automatically transmits the application 125 to portable communication devices associated with a particular role of personnel that matches the desired role when the portable communication devices enter the incident area. When the application 125 is installed on the number of portable communication devices that equals the desired number of personnel for each role, the electronic processor 210 continues to monitor the incident area 120 for a change in the number of portable communication devices that have the application installed (block 330). In this case, the electronic processor 210 does not transmit the application 125 to portable communication devices until the number of portable communication devices that have the application installed drops below the desired number of portable communication devices.

Figure 4:
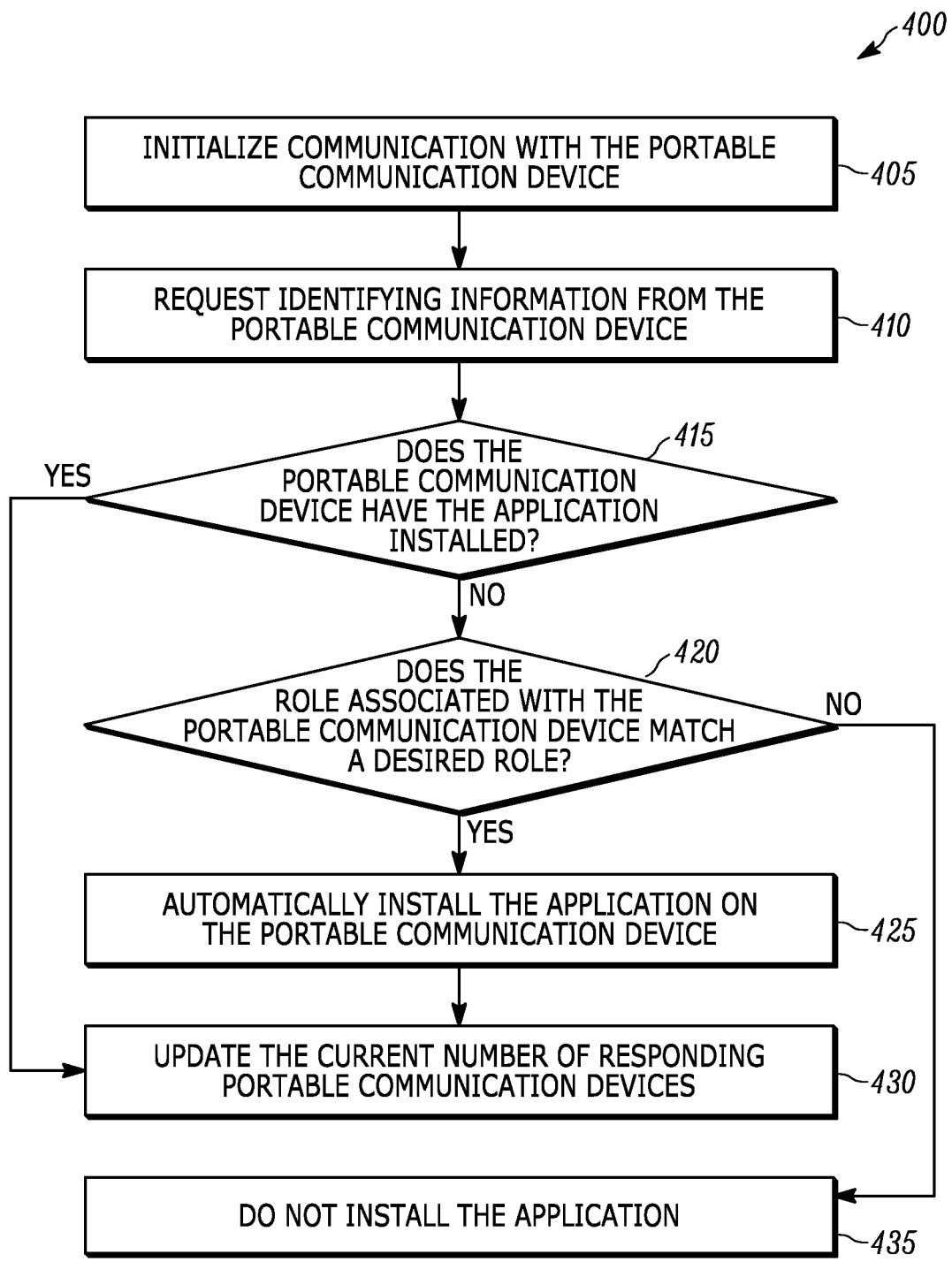
FIG. 4 is a flowchart of a method of distributing the application by the communication server of FIG. 2 to a particular portable communication device in accordance with some embodiments.

FIG. 4 illustrates a method 400 of distributing the application 125 by the communication server 105 to the portable communication device 110 according to one example. The method 400 thus provides additional detail relating to the method 300 with reference to a single portable communication device. The method 400 may be performed by the electronic processor 210 for each of the portable communication devices within the incident area 120.

In the method 400, the electronic processor 210 initializes communication with the portable communication device 110 (block 405). For example, when the portable communication device 110 enters within range of the wireless communication network 100, the communication server 105 may authenticate and register the portable communication device 110 with the wireless communication network 100.

As part of the registration process, the electronic processor 210 requests identifying information from the portable communication device 110 (block 410). The identifying information may include a current location, a device identification (for example, a subscriber ID number), an identification of a current user (for example, a user profile), communication group information, an operating system and the like. This information may be automatically uploaded to the communication server 105. In one example, the user profile may be associated with a particular group of emergency responders (i.e., firefighters, police officers, government personnel, emergency medical technicians (EMT), and the like). The user profile may also indicate whether certain equipment may be present within the incident area 120 (for example, police canine unit (K-9 unit), forensic kit, defibrillator, and the like). As a consequence, the electronic processor 210 is able to determine how many of the desired number and desired type of personnel are within the incident area based on the identifying information.

The electronic processor 210 then determines if the application 125 is installed on the portable communication device 110 (block 415). The electronic processor 210 may determine this from the identifying information obtained in block 410. When the application 125 is not yet installed on the portable communication device 110, the electronic processor 210 determines whether the role of the personnel associated with the portable communication device 110 matches one of the desired roles (block 420). When the electronic processor 210 identifies the portable communication device 110 as associated with a user profile that matches one of the desired roles and when the application 125 is not yet installed, the electronic processor 210 automatically sends a control signal to the portable communication device to install the application 125 on the portable communication device 110 (block 425).

In some embodiments, the electronic processor 210 first selects the application 125 from a plurality of applications based on the operating system, the user profile, or both. For example, the communication server 105 may include multiple versions of the application 125 that are each compatible with a different operating system on the portable communication device 110. The electronic processor 210 automatically selects the appropriate version of the application 125 for transmission to the portable communication device 110.

The communication server 105 may also include multiple versions of the application 125 that are specifically tailored to the particular user profile of the portable communication device 110. For example, when the user profile indicates that the portable communication device 110 is associated with a police officer, the electronic processor 210 may transmit an application with functionality designed specifically for the police officer. Accordingly, when the electronic processor 210 determines that a version of the application 125 is available for the specific user profile, the electronic processor 210 transmits that version of the application 125. The user profile may also be used by the electronic processor 210 to determine a priority level (i.e., an access level) to particular network resources. In particular, the priority level may be set and included in the application 125 based on the user profile. The priority level thus enables differing levels of access to the secured server-based resources.

The communication server 105 may also include multiple versions of the application 125 that are tailored to be compatible with a particular communication capability of the portable communication device 110. In this case, the electronic processor 210 is configured to identify the type of communication capability of the portable communication device 105 and automatically select and transmit a version of the application from the multiple available applications that is compatible with the type of communication capability.

Once installed, the electronic processor 210 updates the current number of responding portable communication devices (block 430). Similarly, when the electronic processor 210 determines that the application 125 is already installed on the portable communication device 110 (block 415), the electronic processor 210 updates the current number of responding portable communication devices (block 430). In this case, the electronic processor 210 does not transmit the application 125 to the portable communication device 110.

In some embodiments, blocks 405-415 of method 400 are performed for all of the portable communication devices within the incident area 120 prior to block 420. As a consequence, the electronic processor 210 may first identify which of the desired personnel are already present and responding to the public safety event 115 within the incident area 120. Once identified, the electronic processor 210 updates a list of the current number of responding portable communication devices and adjusts the desired number and the desired roles of personnel accordingly. This reduces network traffic by not transmitting the application 125 to other portable communication devices within the incident area 120 once the desired number of personnel is reached.

Figure 5:
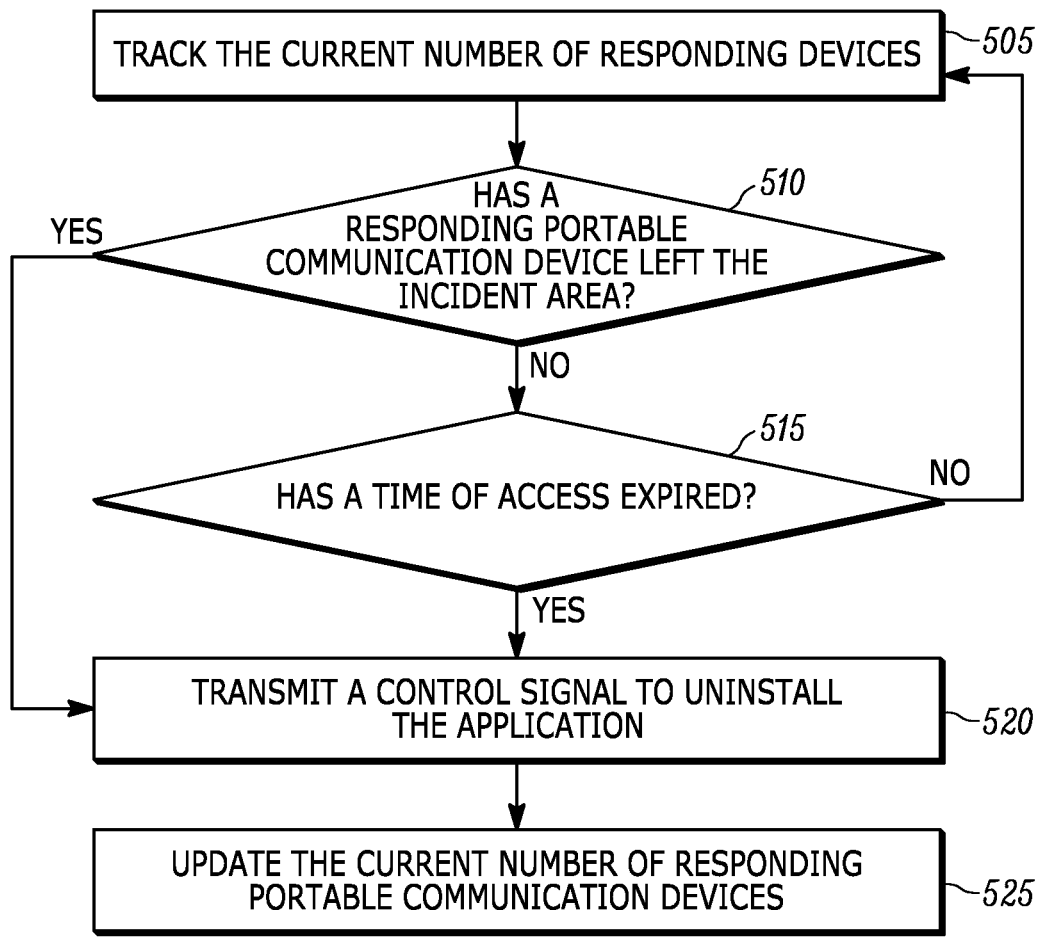
FIG. 5 is a flowchart of a method of tracking distribution of the application with the communication server of FIG. 2 in accordance with some embodiments.

FIG. 5 is a flowchart of a method 500 of tracking distribution of the application 125 with the communication server 105 according to one example. In the illustrated example, the electronic processor 210 tracks the current number of responding devices within the incident area 120 (block 505). In particular, once the desired number and roles of personnel have the application 125 installed on their portable communication devices, the electronic processor 210 waits for a change or an expiration of time of the application 125.

The electronic processor 210 determines whether a responding portable communication device (i.e., a portable communication device 110 that has the application 125 installed) has left the incident area 120 (block 510). The electronic processor 210 also determines whether a time of access to the application 125 has expired (block 515). When the responding portable communication device has left the incident area 120 or when the time of access has expired, the electronic processor 210 sends a control signal to the responding portable communication device that triggers uninstallation of the application 125 (block 520). The electronic processor 210 may then update the current number of responding portable communication devices (block 525). For example, when one of the responding portable communication devices leaves the incident area 120, the electronic processor 210 determines that the desired number of roles of personnel do not have the application 125 installed on their portable communication devices. In this case, the electronic processor 210 may repeat the methods 300 and 400 to install the application 125 on another portable communication device. Conversely, when the responding portable communication device has not left the incident area 120 and when the time of access has not expired, the electronic processor 210 simply continues to track the responding portable communication devices (block 505).

In some embodiments, the electronic processor 210 does not send a control signal to the portable communication device 110 when the time of access expires. Rather, in these embodiments, the application 125 may include a time of expiration of the application 125 and automatically trigger uninstallation of the application 125 when the time expires. Additionally, in some embodiments, the electronic processor 210 does not send a control signal to the portable communication device 110 when the portable communication device 110 leaves the incident area 120. Rather, in these embodiments, the application may automatically uninstall when the portable communication device 110 leaves the incident area 120 (for example, when the GPS coordinates on the portable communication device 110 indicate that the portable communication device 110 is no longer located within the incident area 120).

Once installed, the application 125 provides various types of functionality to the portable communication device 110. For example, in some embodiments, the application 125 provides quick access to resources including files, programs, databases, and the like that may be helpful tools when responding to the public safety event 115. In these embodiments, the resources may be located within the wireless communication network 100 or outside the wireless communication network 100. In either case, the application 125 may include selectable links on the portable communication device 110 to access these resources.

In some embodiments, the application 125 provides access to talkgroups that are formed with other responders (i.e., other portable communication devices that have installed the application). In this way, the application 125 may initialize formation of talkgroups between the responding portable communication devices. In this way, the application 125 defines communication group formation in a particular area based on an event. To enable this functionality and other functionality, the application 125 may include information regarding the other portable communication devices that have the application 125 installed, such as device identifiers (i.e., device IDs), user profiles, communication channel parameters, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of distributing an application to a plurality of portable communication devices in response to a public safety event, the method comprising:
    determining an incident area that geographically surrounds a location of the public safety event;
    determining a desired number and desired roles of personnel to respond to the public safety event;
    determining whether any of the plurality of portable communication devices are located within the incident area;
    determining whether any of the plurality of portable communication devices lack an installation of the application; and
    wirelessly transmitting, via a communications server, the application to portable communication devices that lack the installation of the application, are located within the incident area, and are associated with the desired roles of personnel until the application is installed on a number of portable communication devices that equals the desired number of personnel for each role.

2. The method according to claim 1, further comprising identifying a type of operating system installed on portable communication devices that will receive automatic transmission of the application, and wherein wirelessly transmitting the application to the portable communication devices includes automatically selecting and wirelessly transmitting a version of the application from a plurality of available applications that is compatible with the type of operating system.

3. The method according to claim 2, wherein automatically selecting and wirelessly transmitting the version of the application from the plurality of available applications includes selecting a version of the application that is configured to automatically enable talkgroup formation among the portable communication devices.

4. The method according to claim 2, wherein automatically selecting and wirelessly transmitting the version of the application from the plurality of available applications includes selecting a version of the application that is configured to
    enable access to secured server-based resources, and
    assign priority levels to the plurality of portable communication devices based on the desired roles, the priority levels enabling differing levels of access to the secured server-based resources.

5. The method according to claim 1, further comprising identifying a type of communication capability of portable communication devices that will receive wireless transmission of the application, and wherein wirelessly transmitting the application to the portable communication devices includes automatically selecting and wirelessly transmitting a version of the application from a plurality of available applications that is compatible with the type of communication capability.

6. The method according to claim 1, further comprising identifying a particular role of personnel associated with portable communication devices that will receive automatic transmission of the application, and wherein wirelessly transmitting the application to the portable communication devices includes automatically selecting and wirelessly transmitting a version of the application from a plurality of available applications that is configured for the particular role.

7. The method according to claim 1, further comprising determining how many of the desired number of personnel are within the incident area and, when the desired number of personnel are not within the incident area, wirelessly transmitting the application to portable communication devices associated with a particular role that matches the desired role when entering the incident area.

8. The method according to claim 1, wherein wirelessly transmitting the application to portable communication devices located within the incident area includes wirelessly transmitting a control signal that automatically installs the application on the portable communication devices.

9. The method according to claim 1, further comprising wirelessly transmitting a control signal that uninstalls the application from portable communication devices that leave the incident area.

10. A communication server for distributing an application to a plurality of portable communication devices in response to a public safety event, the communication server comprising:
    an electronic processor and a memory, the electronic processor configured to
        determine a location of an incident area that geographically surrounds the public safety event;
        determine a desired number and desired roles of personnel to respond to the public safety event;
        determine whether any of the plurality of portable communication devices are located within the incident area;

determine whether any of the plurality of portable communication devices lack an installation of the application; and wirelessly transmit the application to portable communication devices that lack the installation of the application, are located within the incident area and are associated with the desired roles of personnel until the application is installed on a number of portable communication devices that equals the desired number of personnel for each role.

11. The communication server according to claim 10, wherein the electronic processor is further configured to identify a type of operating system installed on portable communication devices that will receive wireless transmission of the application and to automatically select and wirelessly transmit a version of the application from a plurality of available applications that is compatible with the type of operating system.

12. The communication server according to claim 10, wherein the electronic processor is further configured to identify a type of communication capability for the portable communication devices that will receive automatic transmission of the application and to automatically select and wirelessly transmit a version of the application from a plurality of available applications that is compatible with the type of communication capability.

13. The communication server according to claim 10, wherein the electronic processor is further configured to identify a particular role of personnel associated with portable communication devices that will receive wireless transmission of the application and to automatically select and wirelessly transmit a version of the application from a plurality of available applications that is configured for the particular role.

14. The communication server according to claim 10, wherein the electronic processor is further configured to determine, based on information from portable communications devices associated with personnel, how many of the desired number of personnel are within the incident area and, when the desired number of personnel are not within the incident area to wirelessly transmit the application to portable communication devices associated with a particular role that matches the desired role when entering the incident area.

15. The communication server according to claim 10, wherein the electronic processor is further configured to wirelessly transmit a control signal that automatically installs the application on the portable communication devices.

16. The communication server according to claim 15, wherein the electronic processor is further configured to select a version of the application that is configured to automatically enable talkgroup formation among the portable communication devices.

17. The communication server according to claim 10, wherein the electronic processor is further configured to
select a version of the application that is configured to enable access to secured server-based resources, and
assign priority levels to the plurality of portable communication devices based on the desired roles, the priority levels enabling differing levels of access to the secured server-based resources.

18. The communication server according to claim 10, wherein the electronic processor is further configured to wirelessly transmit a control signal to uninstall the application from portable communication devices that leave the incident area.

* * * * *